US008044622B2

(12) United States Patent
Yasui (10) Patent No.: US 8,044,622 B2
(45) Date of Patent: Oct. 25, 2011

(54) SENSORLESS CONTROL APPARATUS OF SYNCHRONOUS MOTOR

(75) Inventor: Kazuya Yasui, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 211 days.

(21) Appl. No.: 12/552,308

(22) Filed: Sep. 2, 2009

(65) Prior Publication Data

US 2009/0315495 A1    Dec. 24, 2009

Related U.S. Application Data

(63) Continuation of application No. PCT/JP2008/053958, filed on Mar. 5, 2008.

(30) Foreign Application Priority Data

Mar. 6, 2007   (JP) .................................. 2007-056183

(51) Int. Cl.
   *H02P 6/18*   (2006.01)
(52) U.S. Cl. ............... 318/400.32; 318/400.02
(58) Field of Classification Search ............. 318/400.02, 318/400.32, 700, 720–724
   See application file for complete search history.

(56) References Cited

U.S. PATENT DOCUMENTS

| 4,115,726 A  * | 9/1978 | Patterson et al. ............. 318/722 |
| 4,922,169 A  * | 5/1990 | Freeman ..................... 318/400.1 |
| 5,422,570 A  * | 6/1995 | Moreira ........................ 324/177 |
| 6,801,011 B2 * | 10/2004 | Ide ................................. 318/700 |
| 2009/0200974 A1 | 8/2009 | Yasui |

FOREIGN PATENT DOCUMENTS

| JP | 8-205578    | 8/1996 |
| JP | 3168967     | 3/2001 |
| JP | 2003-153582 | 5/2003 |
| JP | 2004-80986  | 3/2004 |
| JP | 2005-237172 | 9/2005 |
| JP | 2006-185552 | 7/2006 |

OTHER PUBLICATIONS

Office Action issued Nov. 4, 2010, in Chinese Patent Application No. 20080000477.2 (with English translation).

* cited by examiner

*Primary Examiner* — Bentsu Ro
(74) *Attorney, Agent, or Firm* — Oblon, Spivak, McClelland, Maier & Neustadt, L.L.P.

(57) ABSTRACT

A PWM modulation unit modulates a three-phase voltage instruction, which is input, on the basis of a PWM method, and outputs a gate signal to each phase switching element of an inverter. A high-frequency component arithmetic unit calculates, at each time of switching of the inverter, a high-frequency component of a current occurring due to a voltage which is determined by the PWM modulation unit and is output from the inverter. An index arithmetic unit calculates, as an index R proportional to a rotational phase angle estimation error, from the high-frequency component of the current. A rotational phase angle estimation unit executes an estimation arithmetic operation of the rotational phase angle by using the index R. The invention provides a synchronous motor sensorless control apparatus which enables stable driving with simple adjustment, and does not cause an extreme increase in amount of arithmetic calculations.

9 Claims, 8 Drawing Sheets

SENSORLESS CONTROL APPARATUS OF SYNCHRONOUS MOTOR

CROSS-REFERENCE TO RELATED APPLICATIONS

This is a Continuation application of PCT Application No. PCT/JP2008/053958, filed Mar. 5, 2008, which was published under PCT Article 21(2) in Japanese.

This application is based upon and claims the benefit of priority from prior Japanese Patent Application No. 2007-056183, filed Mar. 6, 2007, the entire contents of which are incorporated herein by reference.

BACKGROUND OF THE INVENTION

1. Field of the Invention

The present invention relates to a sensorless control apparatus which controls a synchronous motor by a PWM inverter, by estimating a rotational phase angle of a rotor.

2. Description of the Related Art

In a control apparatus of a synchronous apparatus having electrical saliency at a rotor thereof, a detector is needed to detect a rotational phase angle of the rotor in order to execute driving control of the synchronous apparatus. However, in the driving apparatus using the detector, there are, for example, the following problems.

First, the presence of the detector increases the volume of the entire driving system. This hinders an increase in output of the synchronous apparatus in a limited installation space. Secondly, the detector itself requires a maintenance/inspection work. This deteriorates the maintenance/inspection efficiency. Thirdly, noise, or the like, is superimposed on a signal line from the detector, leading to disturbance in detection value and degradation in control performance. Fourthly, most of detectors require power supplies for the driving thereof, and it is necessary to install a power supply which is separate from the power supply for the synchronous apparatus driving. This becomes a factor in increase in load in terms of power supply installation space, power supply wiring and cost.

For the above reasons, there has been developed a control method which estimates a rotational phase angle without using a detector, and executes driving control on the basis of the estimated rotational phase angle. This is called "sensorless control".

The following patent document 1, for instance, proposes a method which is particularly effective in a stop/low-speed state in a control apparatus of a synchronous apparatus including such sensorless control means. In this document, in a system which drives the synchronous apparatus by a PWM inverter, a high-frequency voltage instruction, which has a sufficiently high frequency relative to the driving frequency of the synchronous apparatus, is superimposed on a control instruction of a control apparatus which controls the inverter. From a resultant high-frequency current response, a component corresponding to the superimposed high-frequency instruction is detected and processed. Thereby, an error of the rotational phase angle is obtained. The rotational phase angle is estimated by using this error of the rotational phase angle.

The following patent document 2 proposes a method which solves a problem in patent document 1. In this method, a high-frequency component of an electric current, which occurs due to the voltage that is output from a PWM inverter, is calculated, and a rotational phase angle is estimated by using a spatial distribution of inductance.

Patent document 1: Registered Japanese Patent No. 3168967

Patent document 2: Japanese Patent Application No. 2006-185552.

BRIEF SUMMARY OF THE INVENTION

The above-described control apparatus of the synchronous apparatus is advantageous in that the synchronous apparatus can be controlled without using a sensor, with the cost being reduced and the maintenance performance being improved. However, in the system of detecting a component of the high-frequency current response corresponding to the high-frequency voltage instruction, as in the sensorless control means disclosed in patent document 1, it is necessary to supply a desired high-frequency current to a motor. Compared to the system using a sensor, there is a problem that loss and noise are extremely increased. In addition, in order to stably estimate the rotational phase angle, it is necessary to finely adjust the amplitude and frequency of the superimposed high-frequency instruction and the method of high-frequency superimposition. In fact, in order to perform stable driving by combining the motor and the control apparatus, complex and time-consuming adjustment is required. Specifically, since the characteristics of the motor vary due to the variation in inductance which is caused by the saturation of a motor coil, it is necessary, for example, to change the high-frequency superimposition method according to the torque current of the motor, or to finely adjust the high-frequency current detection method.

In addition, in the sensorless control means disclosed in patent document 2, in order to solve the problem in the above-described patent document 1, the rotational phase angle is estimated by using the spatial distribution of inductance. However, since the spatial distribution of inductance is used, the amount of calculations may increase in some cases, and this is not desirable for the synchronous apparatus control which executes arithmetic operations at arithmetic frequencies of several kHz in general.

The present invention has been made in consideration of the above-described problems, and the object of the invention is to provide a sensorless control apparatus which can perform stable driving with simple adjustment, without causing an extreme increase in the amount of calculations.

According to the present invention, there is provided a sensorless control apparatus of a synchronous motor, which estimates a rotational phase angle of a rotor having electrical saliency and controls the synchronous motor by a PWM inverter, comprising: a PWM modulation unit which modulates an input control instruction on the basis of PWM and outputs a gate signal to each phase switching element of the inverter; a high-frequency component arithmetic unit which calculates, at each time of switching of the inverter, a high-frequency component of a current which flows in the synchronous motor by a voltage which is determined by the PWM modulation unit and is output from the inverter; an index arithmetic unit which calculates an index proportional to an estimation error of the rotational phase angle, from the high-frequency component of the current on rotational coordinate axes which rotate in sync with rotation of the rotor; and a rotational phase angle estimation unit which executes an estimation arithmetic operation of the rotational phase angle by using the index.

DETAILED DESCRIPTION OF THE INVENTION

In the present invention, a high-frequency component of a variation of current flowing in a synchronous apparatus is calculated. On the basis of the current variation high-frequency component in a dq-axis coordinate system which is synchronous with the rotation of the synchronous apparatus, an index, which is proportional to a rotational phase angle estimation error, is calculated, and the phase angle of a motor rotor is estimated on the basis of this index without using a rotational phase angle sensor.

First Embodiment

An embodiment of a sensorless control apparatus according to the present invention will now be described with reference to the drawings. In the description below, a permanent magnet synchronous apparatus using a permanent magnet for a rotor is taken as an example of the synchronous apparatus.

Figure 1:
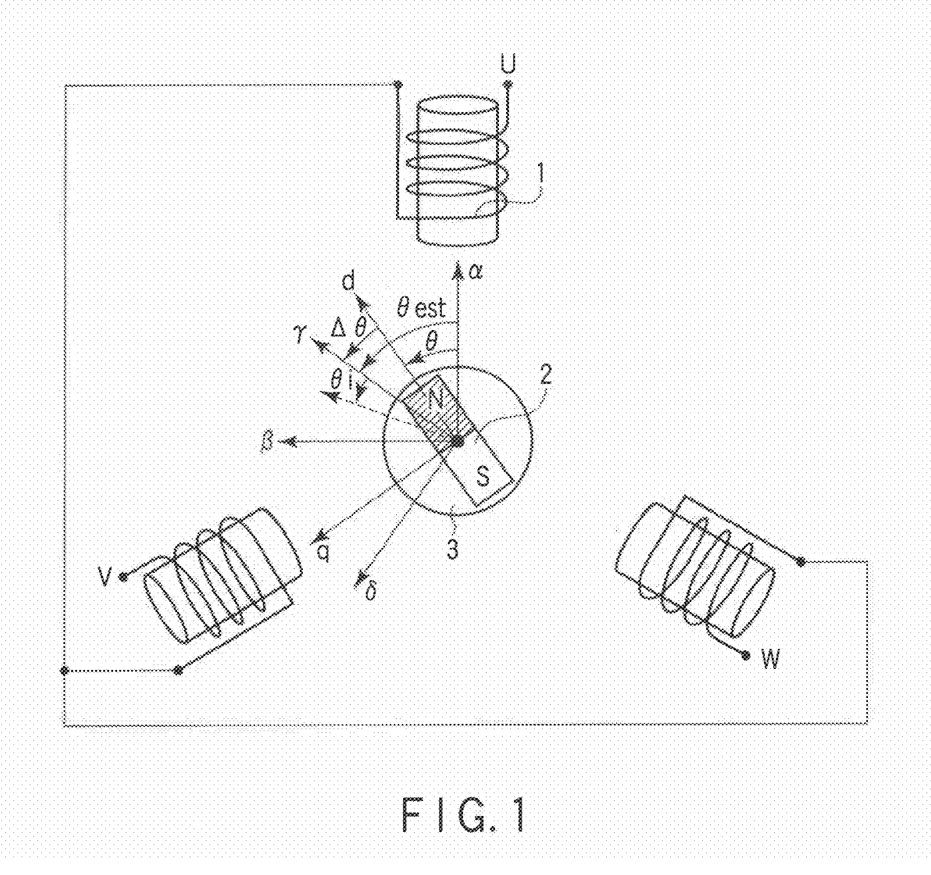
FIG. 1 illustrates a synchronous apparatus model and the definition of coordinates.

As shown in FIG. 1, the permanent magnet synchronous apparatus is represented by a model wherein a stator is composed of three-phase coils U, V, W, and a rotor is composed of a permanent magnet and a yoke therearound. In general, permanent magnet synchronous apparatuses are classified into a surface magnet type and a buried magnet type. The rotor shown in FIG. 1 is a buried magnet type. In the buried magnet type rotor, the distribution of the magnetic circuit of the rotor is not uniform in the circumferential direction. Thus, in the case of driving this rotor, the rotor has such a characteristic that the inductance (=L), as viewed from the stator, varies depending on the rotational angle. This characteristic is called "electrical saliency".

In the control apparatus of this invention, as regards the coordinate system which rotates in sync with the rotation of the permanent magnet synchronous apparatus, the direction of magnetic flux of the permanent magnet is defined as a d-axis, and the axis perpendicular to the d-axis is defined as a q-axis. In addition, the direction of a U-phase coil is defined as an α-axis, a direction perpendicular to the α-axis is defined as a β-axis, and an angle to the d-axis direction from the α-axis direction as a reference direction is defined as a rotational phase angle θ of the synchronous apparatus. On the basis of these definitions, the voltage/current relationship of the permanent magnet synchronous apparatus is expressed by a formula (1):

$$\begin{bmatrix} V_d \\ V_q \end{bmatrix} = \begin{bmatrix} R+pL_d & -\varpi L_q \\ \varpi L_d & R+pLq \end{bmatrix} \begin{bmatrix} I_d \\ I_q \end{bmatrix} + \begin{bmatrix} 0 \\ \varpi \Phi \end{bmatrix} \quad (1)$$

where $V_d$, $V_q$: a d-axis voltage, a q-axis voltage,
$I_d$, $I_q$: a d-axis current, a q-axis current,
R: a resistance,
$L_d$: a d-axis inductance,
$L_q$: a q-axis inductance,
Φ: permanent magnet flux,
ω: a rotational speed,
p: a differential operator.

In the control apparatus of the present invention, however, since a rotational phase angle sensor is not provided, the rotational phase angle θ itself cannot be detected. Thus, a phase angle, which is estimated in the control apparatus, is used as a substitute. Accordingly, as shown in FIG. 1, an estimation phase angle is defined as $\theta_{est}$, and the corresponding coordinate system is defined as a γ-axis and a δ-axis. When an estimation error Δθ occurs, the γδ-axis rotates by the estimation error Δθ from the dq-axis.

Figure 2:
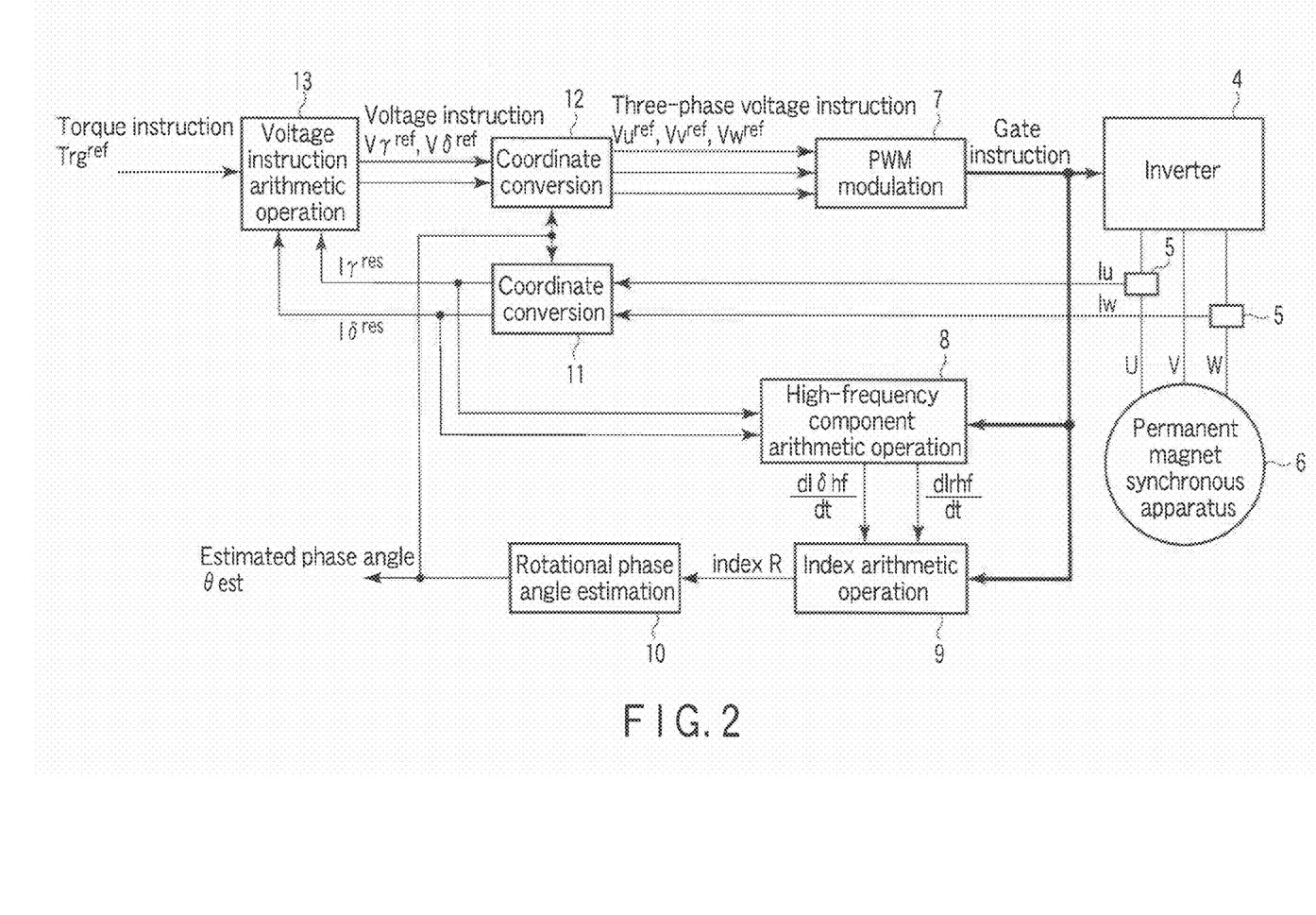
FIG. 2 is a block diagram showing the structure of a first embodiment of the present invention.

FIG. 2 is a functional block diagram showing a structure example of the sensorless control apparatus of the synchronous apparatus according to the present embodiment.

An inverter 4 receives, as an input, a gate instruction for driving the inverter, and switches ON/OFF of a main circuit switching element which is included in the inverter, thereby mutually converting AC/DC power. In the present invention, DC power is converted to AC power.

A permanent magnet synchronous apparatus 6 generates a magnetic field by three-phase AC current which flows in each excitation phase, and generates torque by a magnetic interaction with a rotor.

A PWM modulation unit 7 modulates a control instruction for driving the permanent magnet synchronous apparatus by PWM (Pulse Width Modulation) and outputs a gate signal which is an ON/OFF instruction of each phase switching element of the inverter.

Current detection units 5 detect two-phase or three-phase current response values of three-phase AC currents flowing in the permanent magnet synchronous apparatus. The current response value is indicative of a response value to an instruction value of, e.g. a three-phase voltage instruction, and in this example the current response value is indicative of the magnitude of current flowing in the synchronous apparatus 6. FIG. 2 shows the structure for detecting two-phase currents. A high-frequency component arithmetic unit 8 calculates a high-frequency current component from the current response value at each time of switching of the inverter 4.

An index arithmetic unit 9 calculates, from the high-frequency current component, an index which is a component proportional to a rotational phase angle estimation error. A rotational phase angle estimation unit 10 executes a conversion calculation on the basis of the index that is calculated in the index arithmetic unit 9, and estimates a rotational phase angle of the permanent magnet synchronous apparatus.

Next, a description is given of the operation and effect of the sensorless control apparatus according to the present embodiment having the above-described structure.

In FIG. 2, three-phase voltage instructions $V_u^{ref}$, $V_v^{ref}$, and $V_w^{ref}$, which are inputs to the PWM modulation unit 7, are given, for example, in the following manner, on the basis of a torque instruction $Trq^{ref}$ of a torque that is to be output by the permanent magnet synchronous apparatus 6.

To begin with, the torque instruction $Trq^{ref}$ is delivered from an upper-level control system. On the basis of this torque instruction, a voltage instruction arithmetic unit 13 calculates a γ-axis current instruction $I\gamma^{ref}$ and a δ-axis current instruction $I\delta^{ref}$, as expressed by the following formula (2):

$$I_\gamma^{ref} = Trq^{ref} \cdot k \cdot \cos(\theta_i)$$

$$I_\delta^{ref} = Trq^{ref} \cdot k \cdot \sin(\theta_i) \quad (2)$$

where $Trq^{ref}$: the torque instruction, k: a constant, $\theta_i$: a current phase angle with reference to the γ-axis in the γδ-axis coordinate system (see FIG. 1).

The current phase angle $\theta_i$ may be considered to be a fixed value in the present embodiment. In the meantime, a table, in which the torque instruction can be referred to as a parameter, may be prepared, and the current instructions $I\gamma^{ref}$ and $I\delta^{ref}$ may be given by referring to this table. The method of using the table is effective, for example, in a case where it is not preferable to formulize the relationship between torque and current in the above-described manner (e.g. in a case where the current phase angle $\theta_i$ is varied in accordance the torque instruction value).

Next, the voltage instruction arithmetic unit 13 receives, as inputs, the current instructions $I\gamma^{ref}$, $I\delta^{ref}$, which have been obtained as described above, and a γ-axis response value $I\gamma^{ref}$ and δ-axis response value $I\delta^{ref}$ of currents flowing in the synchronous apparatus, and the voltage instruction arithmetic unit 13 calculates and outputs a γ-axis voltage instruction $V\gamma^{ref}$ and δ-axis voltage instruction $V\delta^{ref}$, by the following proportional integration control:

$$V_\gamma^{ref} = \left(K_p + K_i \cdot \frac{1}{s}\right) \cdot (I_\gamma^{ref} - I_\gamma^{res}) \quad (3)$$

$$V_\delta^{ref} = \left(K_p + K_i \cdot \frac{1}{s}\right) \cdot (I_\delta^{ref} - I_\delta^{res})$$

where $K_p$: a proportion gain, $K_i$: an integration gain, s: a Laplace operator.

The cycle of the arithmetic operation is, e.g. several μm to several ms, although the cycle varies depending on systems. This cycle of the arithmetic operation becomes an integration time of the integration term in the formula (3). In formula (3), the γ-axis response value $I\gamma^{ref}$ and δ-axis response value $I\delta^{ref}$ are current response values to the previous γ-axis voltage instruction $V\gamma^{ref}$ and δ-axis voltage instruction $V\delta^{ref}$. At the time of start of control, the voltage instruction arithmetic unit 13 receives the detected current values at this time as the γ-axis response value $I\gamma^{ref}$ and δ-axis response value $I\delta^{ref}$, and executes the above-described arithmetic operation.

Next, on the basis of the rotational phase angle estimation value $\theta_{est}$ that is output from the rotational phase angle estimation unit 10, a coordinate conversion unit 12 executes coordinate conversion of the γ-axis voltage instruction $V\gamma^{ref}$ and δ-axis voltage instruction $V\delta^{ref}$, which are output as described above, by the following arithmetic operation, and outputs three-phase voltage instructions $V_u^{ref}$, $V_v^{ref}$, and $V_w^{ref}$:

$$V_u^{ref} = \sqrt{\frac{2}{3}} \{V_\gamma^{ref} \cos(\theta_{est}) - V_\delta^{ref} \sin(\theta_{est})\} \quad (4)$$

$$V_v^{ref} = \sqrt{\frac{2}{3}} \left\{V_\gamma^{ref} \cos\left(\theta_{est} - \frac{2}{3}\pi\right) - V_\delta^{ref} \sin\left(\theta_{est} - \frac{2}{3}\pi\right)\right\}$$

$$V_w^{ref} = \sqrt{\frac{2}{3}} \left\{V_\gamma^{ref} \cos\left(\theta_{est} + \frac{2}{3}\pi\right) - V_\delta^{ref} \sin\left(\theta_{est} + \frac{2}{3}\pi\right)\right\}$$

The three-phase voltage instructions, which are obtained as described above, are input to the PWM modulation unit 7.

The PWM modulation unit 7 executes PWM modulation and outputs the gate instruction to the inverter. In the PWM modulation, the delivered three-phase voltage instructions $V_u^{ref}$, $V_v^{ref}$, and $V_w^{ref}$ are compared with triangular carrier waves which are preset to have constant or variable frequencies, and a comparison results are produced as the gate instruction.

Based on the index R (to be described later) that is calculated by the index arithmetic unit 9 on the basis of the high-frequency component of the current flowing in the synchronous apparatus, the rotational phase angle estimation unit 10 estimates the rotational phase angle estimation value $\theta_{est}$ in the manner as described below.

To begin with, the phase currents, which are detected by the current detection unit 5, are subjected to coordinate conversion by the following arithmetic operation, on the basis of the rotational phase angle estimation value $\theta_{est}$ that is output from the rotational phase angle estimation unit 10, and the γ-axis response value $I\gamma^{ref}$ and δ-axis response value $I\delta^{ref}$ can be obtained:

$$I_\gamma^{res} = \sqrt{\frac{2}{3}} \begin{Bmatrix} I_u^{res}\cos(\theta_{est}) + \\ I_v^{res}\cos\left(\theta_{est} - \frac{2}{3}\pi\right) + \\ I_w^{res}\cos\left(\theta_{est} + \frac{2}{3}\pi\right) \end{Bmatrix} \quad (5)$$

$$I_\delta^{res} = -\sqrt{\frac{2}{3}} \begin{Bmatrix} I_u^{res}\sin(\theta_{est}) + \\ I_v^{res}\sin\left(\theta_{est} - \frac{2}{3}\pi\right) + \\ I_w^{res}\sin\left(\theta_{est} + \frac{2}{3}\pi\right) \end{Bmatrix}$$

If use is made of the fact that the sum of the three-phase currents flowing in the permanent magnet synchronous apparatus is 0, the γ-axis response value $I\gamma^{ref}$ and δ-axis response value $I\delta^{ref}$ can be found from the two-phase current values (in this example, $I_u^{ref}$, $I_w^{ref}$) of the three-phase currents, as expressed by the following formula. In this manner, a coordinate conversion unit 11 calculates the γ-axis response value $I\gamma^{ref}$ and δ-axis response value $I\delta^{ref}$. In this case, it should suffice if current detection units 5 for only the two phases are provided, and the apparatus can be simplified, compared to the case of executing detection for the three phases.

$$I_\gamma^{res} = \sqrt{2} \left\{I_u^{res}\sin\left(\theta_{est} + \frac{2}{3}\pi\right) - I_w^{res}\sin(\theta_{est})\right\} \quad (6)$$

$$I_\delta^{res} = \sqrt{2} \left\{I_u^{res}\cos\left(\theta_{est} + \frac{2}{3}\pi\right) - I_w^{res}\cos(\theta_{est})\right\}$$

Next, the high-frequency component of the γδ-axis current response values, which are obtained as described above, is calculated by the following arithmetic operation:

$$\frac{dI_{\gamma\delta hf}}{dt} = \frac{1}{t_n - t_m} \cdot \left\{ (I_n - I_m) - \frac{dI_{base}}{dt} \cdot (t_n - t_m) \right\} \quad (7)$$

where $I_m$: a synchronous apparatus input current at time $t_m$,
$I_n$: a synchronous apparatus input current at time $t_n$,
$dI_{base}/dt$: a time variation ratio of a basic wave component of an input current (an electrical rotational frequency component).

Figure 3:
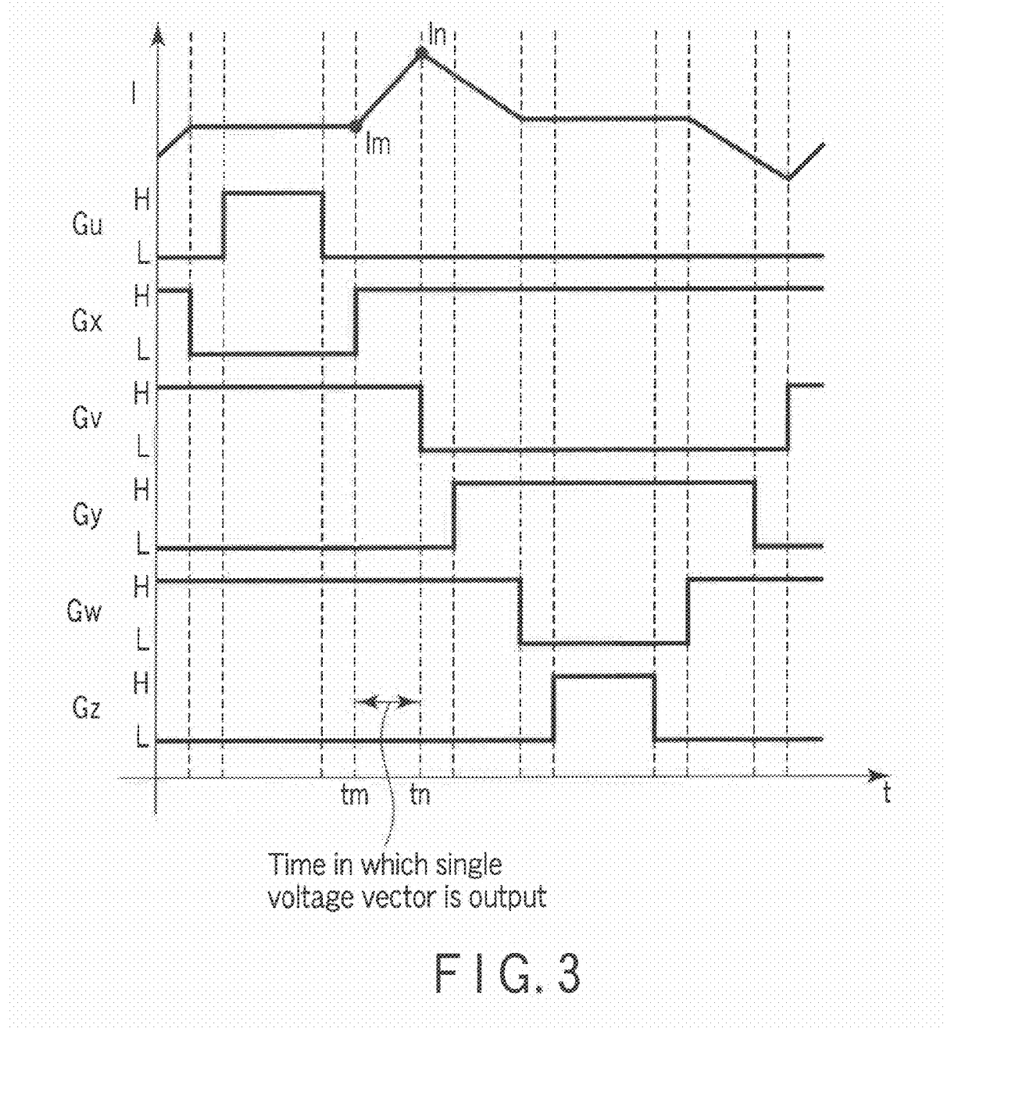
FIG. 3 is a timing chart of a gate signal and a corresponding synchronous apparatus current.

FIG. 3 shows a timing chart.

As a method of calculating $dI_{base}/dt$, there is a method of calculating a variation ratio of an input current or a variation ratio of a current instruction value during a time period which is sufficiently longer than $t_n - t_m$. The calculation can be performed with no problem, if $t_n - t_m$ is set to be sufficiently shorter than the basic wave component calculation time interval, even if the basic wave component is not strictly a rotational frequency component. Specifically, the time $t_n - t_m$ becomes about several µs to several-ten µs, and the basic wave component time variation ratio may be a variation ratio in a time interval which is about several-ten to several-hundred times greater than that.

The time points $t_m$ and $t_n$ are set at the beginning point and end point of a time in which a single voltage vector is output, with a break-point being set at the switching of the gate instruction that is output from the PWM modulation unit 7 (=the switching of the inverter element). The beginning point and end point may be made to coincide with the switching time of the gate instruction, or may be set at a time immediately before or immediately after the switching in the case where large noise is superimposed on the current value due to noise that is caused by the switching of the inverter element.

On the basis of the above formula (7), the high-frequency component arithmetic unit 8 calculates and outputs a γ-axis high-frequency component and a δ-axis high-frequency component according to the following formula:

$$\frac{dI_{\gamma hf}}{dt} = \frac{1}{t_n - t_m} \cdot \left\{ (I_{\gamma(n)} - I_{\gamma(m)}) - \frac{dI_{\gamma base}}{dt} \cdot (t_n - t_m) \right\} \quad (8)$$

$$\frac{dI_{\delta hf}}{dt} = \frac{1}{t_n - t_m} \cdot \left\{ (I_{\delta(n)} - I_{\delta(m)}) - \frac{dI_{\delta base}}{dt} \cdot (t_n - t_m) \right\}$$

where $I\gamma_{(m)}$: γ-axis current value $I\gamma^{res}$ at time point m,
$I\gamma_{(n)}$: γ-axis current value $I\gamma^{res}$ at time point n,
$dI\gamma_{base}/dt$: a time variation ratio of a basic wave component of γ-axis current,
$I\delta_{(m)}$: δ-axis current value $I\delta^{res}$ at time point m,
$I\delta_{(n)}$: δ-axis current value $I\delta^{res}$ at time point n,
$dI\delta_{base}/dt$: a time variation ratio of a basic wave component of γ-axis current.

Next, from the high-frequency component of the current, which is calculated as described above, the index arithmetic unit 9 calculates a component proportional to the estimation error of the rotational phase angle, that is, the index R. According to an arithmetic operation as expressed by formula (9), the index R is found by projecting the current high-frequency component in the γδ axis to a predetermined angular direction $\theta_{est}$ from the γ-axis. This arithmetic operation may be said to be an inner product between the unit vector in the direction of angle $\theta_{est}$ and the high-frequency component.

$$R = \frac{dI_{\gamma hf}}{dt} \cdot \cos(\theta_{set}) + \frac{dI_{\delta hf}}{dt} \cdot \sin(\theta_{set}) \quad (9)$$

Figure 4:
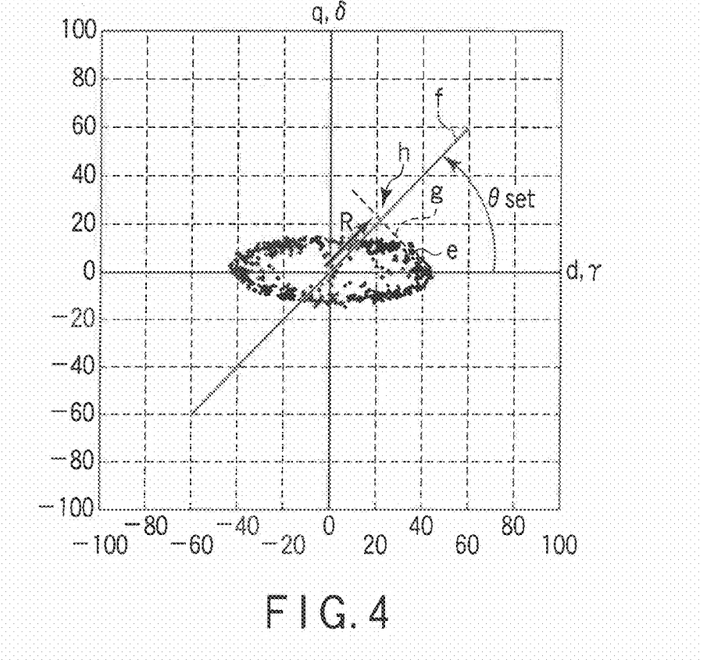
FIG. 4 is an arithmetic image diagram of an index R.

The calculation result of the index R can be expressed in a graph, as shown in FIG. 4. In FIG. 4, points, which are distributed in an elliptic shape, represent the high-frequency current component on the rotational coordinate axis (dq axis). Specifically, FIG. 4 shows a distribution of high-frequency current, representing the magnitudes and directions of response currents (high-frequency currents) in the case where voltages are applied to the stator in directions over 360° with respect to the d-axis of the rotor such as to create the same magnitude of the voltages. The permanent magnetic rotor with electrical saliency as shown in FIG. 1 has a low inductance in the d-axis direction and a high inductance in the q-axis direction. Thus, the distribution of the high-frequency current has such an elliptic shape that the major axis agrees with the d-axis. FIG. 4 shows a calculation result of the index R on the basis of this distribution. In addition, FIG. 4 shows the index R at a time when the d-axis agrees with the γ-axis, that is, when Δθ is 0°.

The high-frequency current [di/dt] is determined by the output voltage of the inverter and the inductance of the motor, and its distribution model becomes an elliptic distribution as shown in FIG. 4 in the motor of the present embodiment. The inductance of the motor does not vary if the driving condition is the same. In addition, the output voltage does not vary since the inverter can output only voltage vectors with a fixed amplitude. Thus, normally, the distribution of the high-frequency current is considered to be present only on the ellipsoid as shown in FIG. 4. However, experimentally, there occurs data that does not meet the model, for example, in a case where proper di/dt cannot be measured (e.g. in a case where dt is extremely short). Since such data appears inside the ellipsoid, the high-frequency current has a distribution as shown in FIG. 4.

The γ-axis and δ-axis high-frequency component which is found by formula (8) indicates one of a plurality of points that constitute the ellipsoid. Point e is an example of the γ-axis and δ-axis high-frequency component which is found by formula (8). The index R corresponds to the distance from an intersection h between a perpendicular line g, which is drawn from the point e to a straight line f in the $\theta_{est}$ direction, and the straight line f, to the origin of the dq axis. In FIG. 4, the predetermined direction $\theta_{est}$ is set in the direction of 45°. However, the same index can be found in the 225° direction which is opposite to the 45° direction over 180°.

Figure 5:
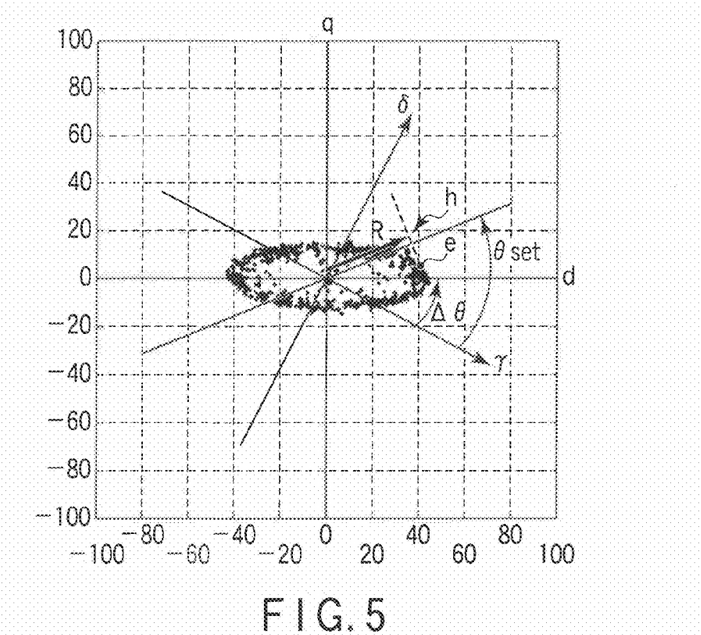
FIG. 5 shows the index R at a time when an estimation error Δθ occurs between a d-axis and a γ-axis.

FIG. 5 shows an index R at a time when an estimation error Δθ occurs between the d-axis and the γ-axis. In FIG. 5, the estimation error Δθ occurs in a minus direction relative to the d-axis, and the index R has a greater value than in the case where the estimation error Δθ is 0° as shown in FIG. 4.

Figure 6:
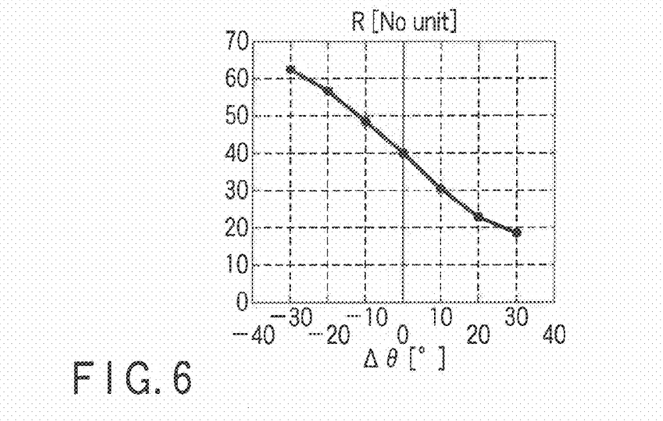
FIG. 6 is a characteristic diagram of the index R and a rotational phase angle estimation error.

The relationship in correspondency between the calculated index R and estimation error Δθ is as shown in FIG. 6. FIG. 6 shows a calculation result of the index R, which is obtained by varying the estimation error Δθ between the γ-axis and the d-axis in the neighborhood of the state (Δθ=0°) in which the γ-axis agrees with the d-axis. In the neighborhood of the zero point of the estimation error Δθ, the index R and the estimation error Δθ have a proportional relationship. In the case of FIG. 6, when the estimation error Δθ is 0°, the index R is 40.

The calculation of the index shown in formula (9) is executed a plural number of times, and the maximum one of the calculated values is determined as the index R. The thus determined index R can be estimated to be the index of the high-frequency current component which is distributed on the outermost side of the ellipsoid in FIG. 4. At this time, the perpendicular line g, which is drawn to the straight line f in the $\theta_{est}$ direction from the point e indicative of the high-frequency component, becomes a tangent line of the ellipsoid, and an exact index R can be obtained.

One index R is determined in the cycle of the calculations of formulae (2) to (6). Specifically, during one cycle of the calculations of formulae (2) to (6), a plurality of indices are calculated by varying the time points tm and tn in FIG. 3, and the maximum one of the calculated values is determined as the index R.

Figure 7:
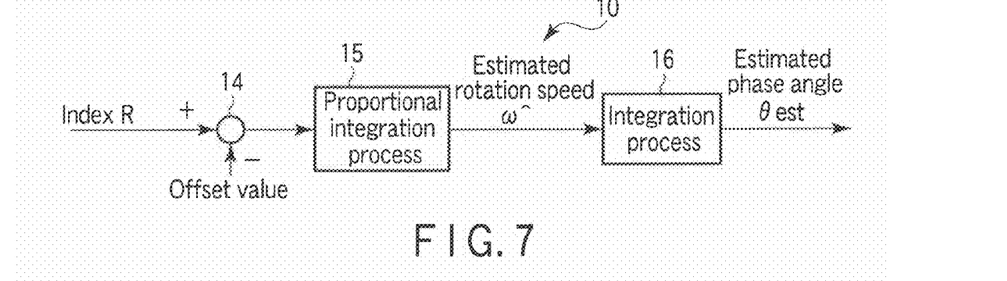
FIG. 7 is a block diagram showing the structure of a rotational phase angle estimation unit.

Next, the rotational phase angle estimation is executed by using the index R that is calculated as described above. FIG. 7 is a block diagram of the rotational phase angle estimation unit 10. As shown in FIG. 7, a process is executed to adjust the estimated rotational speed ω^ by proportional integration control by using the index R as an input, and to integrate the adjusted estimated rotational speed ω^, thus producing the estimated phase angle $\theta_{est}$. A subtracter 14 subtracts an offset value from the index R, and outputs a difference ΔR. This offset value is an index R at a time when the estimated phase angle $\theta_{est}$ is 0°. In the case of the present embodiment, the offset value is, e.g. 40, as shown in FIG. 6. A proportional integration process unit 15 receives the difference ΔR, executes a proportional integration arithmetic operation as expressed by the following formula, and outputs the estimated rotational speed ω^:

$$\omega^{\wedge} = Kp \cdot \Delta R + Ki \cdot \frac{1}{s} \cdot \Delta R \quad (10)$$

where $K_p$: a proportion gain,
$K_i$: an integration gain, and
s: a Laplace operator.

An integration process unit 16 integrates the estimated rotational speed ω^ and outputs the estimated phase angle $\theta_{est}$.

In the above-described proportional integration process, as shown in FIG. 6, the index R and the estimation error Δθ have an inverse proportional relationship. Thus, in the case where the estimation error occurs in the direction of delay, the estimated rotational speed ω^ is adjusted in the direction of acceleration. In the case where the estimation error occurs in the direction of progress, the estimated rotational speed ω^ is adjusted in the direction of deceleration. Specifically, in the case where the index R indicates a minus-side estimation error Δθ, the estimated rotational speed ω^ is increased. In the case where the index R indicates a plus-side estimation error Δθ, the estimated rotational speed ω^ is decreased. By the estimation blocks in FIG. 7, the steady estimation error zero state can be attained, that is, the actual phase angle and the estimated phase angle can be made to agree.

As has been described above, in the sensorless control apparatus according to the present embodiment, the phase angle of the rotor can be estimated without using a rotational phase angle sensor. In addition, the decrease in size, the reduction in cost and the ease in maintenance can be realized, and the arithmetic operation time of the rotational phase angle estimation process can be shortened.

Second Embodiment

Next, a second embodiment of the sensorless control apparatus according to the present invention is described.

An index arithmetic unit in the sensorless control apparatus according to the second embodiment is characterized in that the direction $\theta_{est}$, in which the current high-frequency component is projected when the index is calculated, is chosen to be a direction in which the sensitivity of the index to the rotational phase angle estimation error Δθ becomes highest, and that the direction $\theta_{est}$ is varied in accordance with the torque that is output from the synchronous apparatus.

Figure 8:
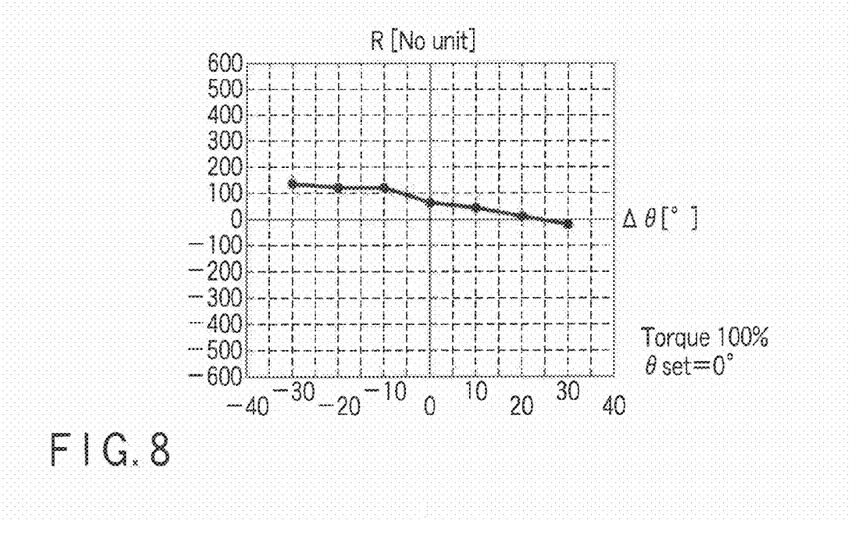
FIG. 8 is a characteristic diagram of the index R versus estimation error at torque 100% and $\theta_{set}=0°$.
Figure 9:
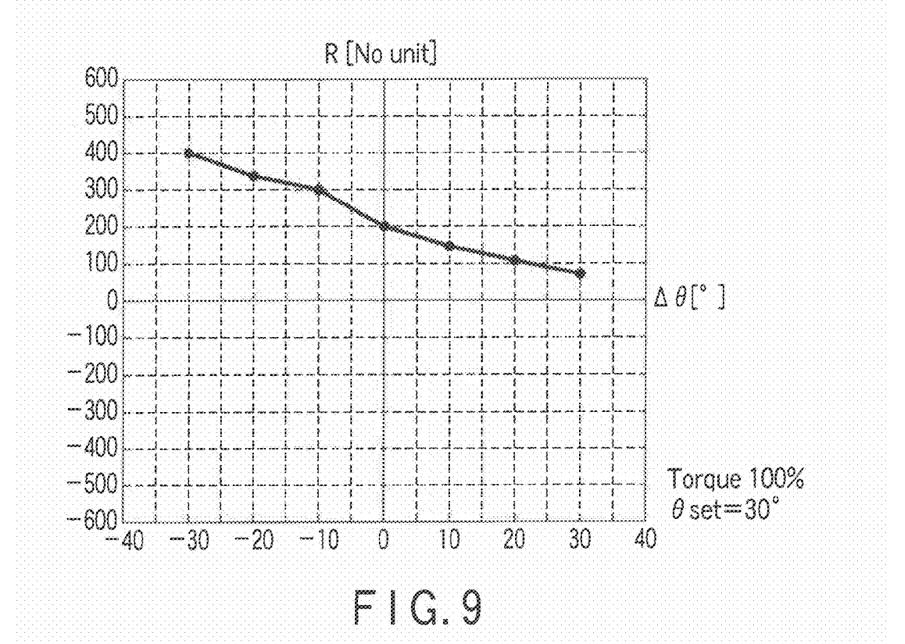
FIG. 9 is a characteristic diagram of the index R versus estimation error at torque 100% and $\theta_{set}=30°$.
Figure 10:
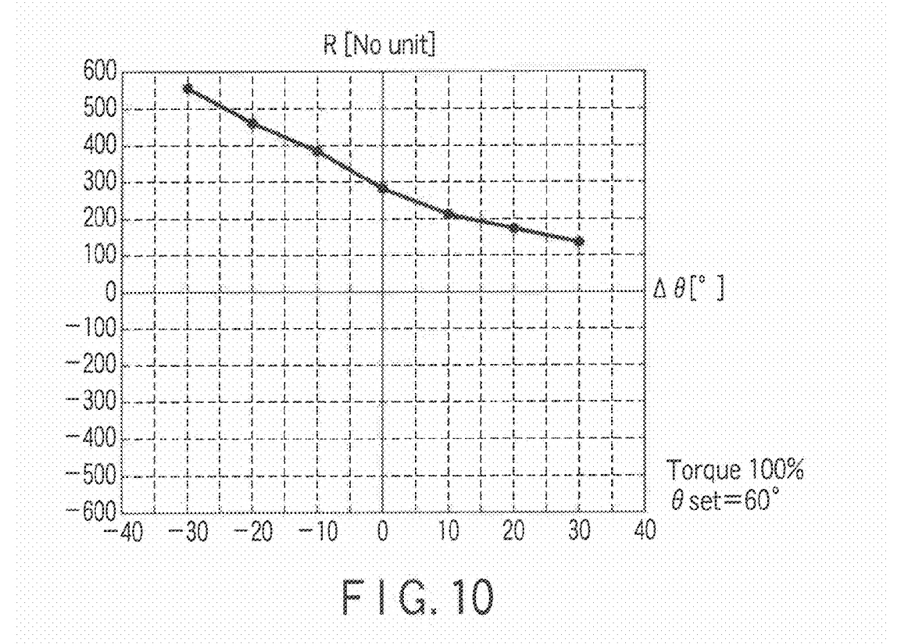
FIG. 10 is a characteristic diagram of the index R versus estimation error at torque 100% and $\theta_{set}=60°$.

FIGS. 8 to 10 show indices R which are calculated by using parameters of a permanent magnet synchronous apparatus which the inventor of the present invention uses as equipment for development. These Figures show the indices R relative to the rotational phase angle estimation error Δθ, and each Figure shows the state in which the torque at 100% (maximum rated torque) is output. FIG. 8 shows characteristics when $\theta_{est}$ is 0°, FIG. 9 shows characteristics when $\theta_{est}$ is 30°, and FIG. 10 shows characteristics when $\theta_{est}$ is 60°. In these Figures, it is understood that the sensitivity of the index R becomes highest when $\theta_{est}$ is 60°. If $\theta_{est}$ is so set that the sensitivity of the index R becomes highest, the S/N ratio of the index R with noise or quantization error can be improved, the proportional and integration gains in FIG. 7 can be set at a large value, and the convergence performance of the estimation arithmetic operation can be improved.

The $\theta_{est}$ at which the sensitivity of the index R becomes highest, as described above, varies in accordance with the torque. This occurs because the magnitude of the current is varied in accordance with the torque to be output, and thus the saturation of the inductance occurs due to the magnitude of current, leading to a variation in distribution of the high-frequency current, based on which the index R is calculated. Thus, by measuring in advance the $\theta_{est}$ at which the maximum sensitivity is obtained according to the torque and varying the $\theta_{est}$ according to the torque instruction, the maximum sensitivity can be always obtained in the state of this output torque. Thereby, as described above, the S/N ratio of the index R with the noise or quantization error is improved. Therefore, the convergence performance of the estimation arithmetic operation can be improved, without the sensitivity decreasing due to the output condition of torque.

As has been described above, in the sensorless control apparatus according to the present embodiment, the phase angle of the rotor can be estimated without using a rotational phase angle sensor. In addition, the decrease in size, the reduction in cost and the ease in maintenance can be realized, and the arithmetic operation time of the rotational phase angle estimation process can be shortened. Furthermore, the convergence performance of estimation can be improved.

Third Embodiment

Next, a third embodiment of the sensorless control apparatus according to the present invention is described.

The sensorless control apparatus according to the third embodiment is characterized by including a high-frequency voltage instruction superimposition unit which superimposes a high-frequency voltage instruction, and is also characterized in that the high-frequency voltage instruction is superimposed such that the sensitivity of the index R becomes highest.

Figure 11:
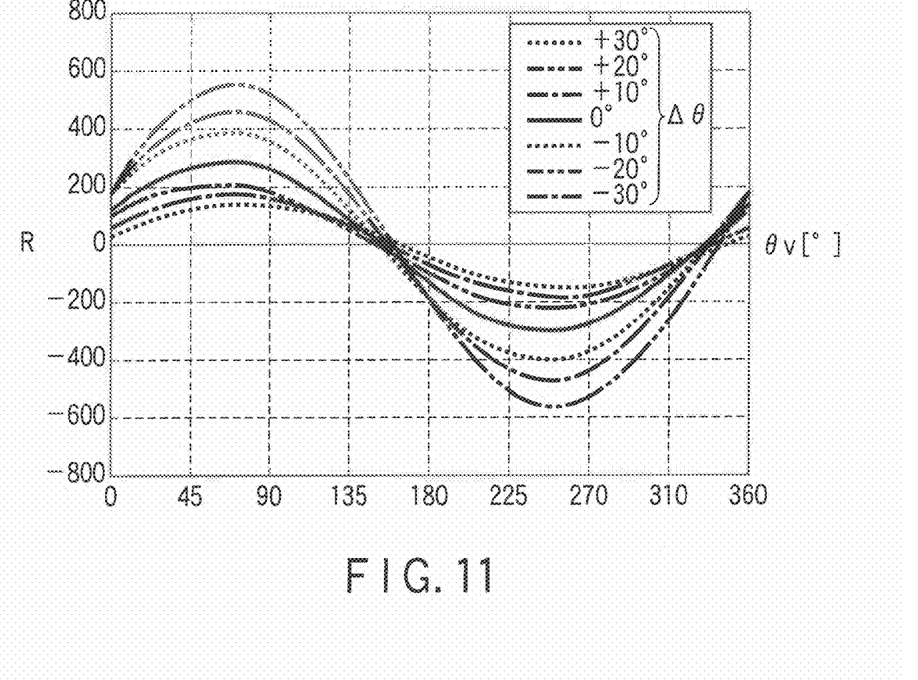
FIG. 11 is a characteristic diagram of a voltage vector angle θv, an index R and an estimation error.
Figure 12:
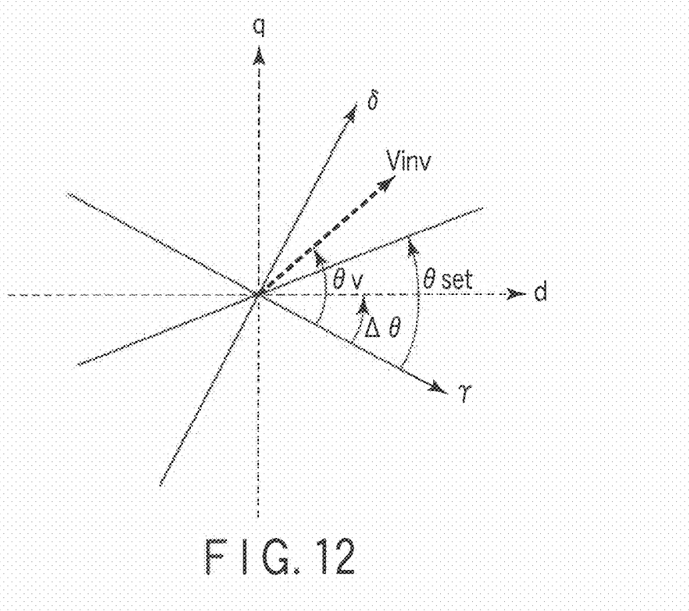
FIG. 12 is a vector line diagram corresponding to FIG. 11.

FIG. 11 shows the relationship between the angle θv, as viewed from the rotational coordinate axis γ of the voltage vector Vinv that is output from the inverter, and the index R which is calculated from the high-frequency current component that is generated by the voltage vector Vinv, with the rotational phase angle estimation error Δθ being varied in units of 10°. FIG. 12 is a vector diagram of this relationship.

Since the characteristics of the index R relative to the rotational phase angle estimation error $\Delta\theta$ is as shown in FIG. 10, the estimation error $\Delta\theta$ can be found from the index R.

As is understood from FIG. 11, the sensitivity of the index R becomes highest in the neighborhood of $\theta v=60°$ to 70°. In short, the sensitivity of the index R can be increased if the voltage vector is set to be output at such angles. However, in normal driving, since the voltage is output in the direction based on the voltage equation of the motor as shown in formula (1), the voltage vector of such desired angles is not necessarily output. Thus, by superimposing the high-frequency voltage instruction on the voltage instructions $I\gamma^{ref}$, $I\delta^{ref}$, shown in FIG. 2, the desired voltage vector can be output. This high-frequency voltage instruction needs to be set at a sufficiently high frequency so as not to affect the normal torque control of the synchronous apparatus 4. The frequency of the high-frequency voltage instruction is, for example, about several times or ten-odd times greater than the number of revolutions of the synchronous apparatus.

Figure 13:
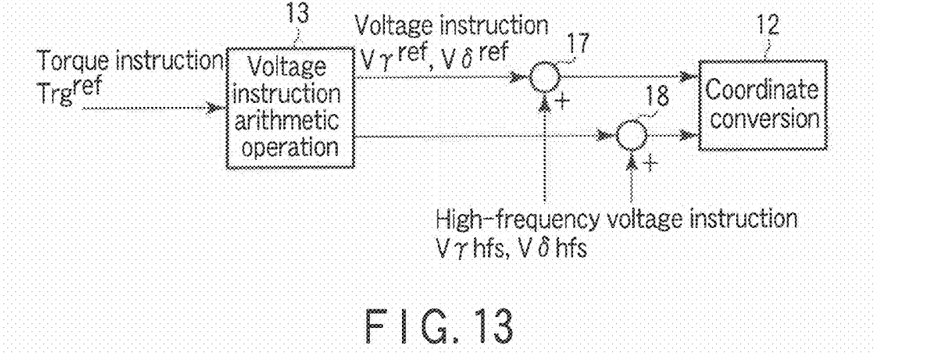
FIG. 13 is a block diagram showing the structure for superimposing a high-frequency voltage instruction on a voltage instruction.
Figure 14:
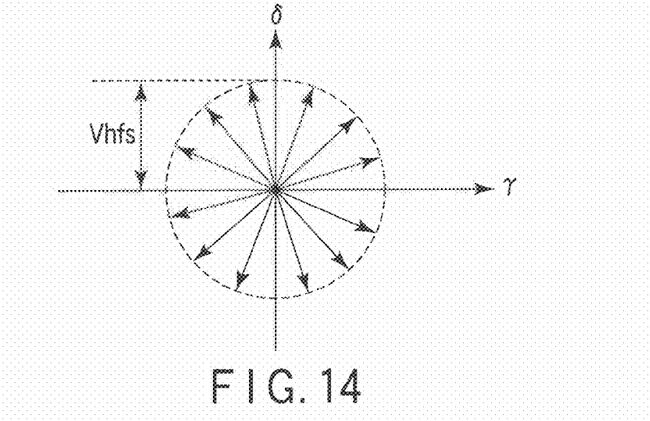
FIG. 14 shows an example of a rotational high-frequency signal.

FIG. 13 is a block diagram showing the structure for superimposing a high-frequency voltage instruction on a voltage instruction. An adder 17 superimposes a high-frequency voltage instruction V$\gamma$hfs on the voltage instruction V$\gamma^{ref}$, and an adder 18 superimposes a high-frequency voltage instruction V$\gamma$hfs on the voltage instruction V$\delta^{ref}$. The high-frequency voltage instructions V$\gamma$hfs and V$\delta$hfs, which are superimposed, may be any instructions, if voltage vectors of desired angles can be included in the voltage vectors that are output from the inverter. For example, rotational high frequencies, as expressed by formula (11), may be adopted. Such rotational high frequencies are shown in FIG. 14.

$$V_\gamma^{hfs} = V^{hfs} \cos(\omega_{hfs} t)$$

$$V_\delta^{hfs} = V^{hfs} \sin(\omega_{hfs} t) \quad (11)$$

where $V_{hfs}$: a high-frequency voltage instruction amplitude, and $\omega_{hfs}$: a high-frequency voltage instruction frequency.

Figure 15:
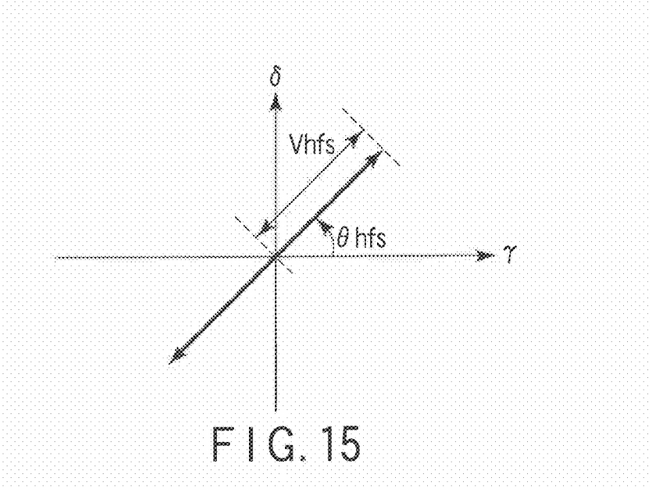
FIG. 15 shows an example of an alternating high-frequency signal.

In addition, alternating frequencies in a desired direction, as expressed by formula (12), may be adopted. FIG. 15 shows such alternating high frequencies.

$$V_\gamma^{hfs} = V^{hfs} \cos(\omega_{hfs} t)\cos(\theta_{hfs})$$

$$V_\delta^{hfs} = V^{hfs} \cos(\omega_{hfs} t)\sin(\theta_{hfs}) \quad (12)$$

where $\theta_{hfs}$: a high-frequency superimposition direction.

In the case of superimposing the alternating high-frequency voltage as expressed by formula (12), it is desirable to set the high-frequency superimposition direction $\theta_{hfs}$ in an angular direction in which the sensitivity of the index R becomes highest. By this setting, the voltage vector that is output from the inverter becomes close to this direction, and as a result the sensitivity of the index R can be increased.

In the case of superimposing the rotational high-frequency voltage as expressed by formula (11), a voltage vector, at which the sensitivity of the index R decreases, is also output. However, if only the index R at a time of the voltage vector, at which the sensitivity of the index R increases, is adopted, there arises no problem. However, if the high frequency is directly superimposed in the direction in which the sensitivity of the index R increases, as expressed by formula (12), the voltage vector, at which the sensitivity increases, is always output, and there is no need to select adoption/non-adoption by the voltage vector. Thus, the arithmetic operation is simplified.

As has been described above, by superimposing the high-frequency voltage instruction on the voltage instruction and by superimposing the high-frequency voltage instruction in the direction in which sensitivity of the index R increases, the index R with high sensitivity can surely be obtained and the stability of the rotational phase angle estimation can be improved.

The characteristics of the index R as shown in FIG. 6 are measured by delivering the same torque instruction, as the torque instruction at the time when a vehicle or the like is driven, to the control apparatus. At this time, the high-frequency current component occurs in the neighborhood of the point e in FIG. 4. However, depending on the actual driving condition, it is possible that the high-frequency current component occurs at a point other than the neighborhood of the point e in FIG. 4, and the relationship between the index R and the estimation error $\Delta\theta$ may not agree with the proportional relationship as shown in FIG. 6 or FIG. 10. Thus, in such a case, for example, if the direction of occurrence of the high-frequency current component is determined by using the alternating high frequency as expressed by formula 12, the proper index R can be obtained.

Specifically, in an embodiment, the high-frequency instruction as expressed by formula (12) is generated, it is confirmed that the index R has a linear characteristic as shown in FIG. 10, and the index R at the time of the estimation error $\Delta\theta=0°$ is stored in a memory. When the rotational phase angle is estimated at the time of actual driving, the same high-frequency instruction as the high-frequency instruction at the time of acquiring the characteristics of the index R is superimposed on the voltage instruction, as shown in FIG. 13, and the index R is calculated. Thereby, the position of the occurrence of the high-frequency current component is determined, for example, as shown in FIG. 4, and the proper index R with high sensitivity can be obtained. The thus obtained index R and the index R at the time of $\Delta\theta=0°$, which is acquired in advance as an offset value, are delivered to the subtracter 14 of the rotational phase angle estimation unit 10 shown in FIG. 7, and the estimated phase angle $\theta_{est}$ is found.

As has been described above, in the sensorless control apparatus according to the present embodiment, the phase angle of the rotor can be estimated without using a rotational phase angle sensor. In addition, the decrease in size, the reduction in cost and the ease in maintenance can be realized, and the arithmetic operation time of the rotational phase angle estimation process can be shortened. Furthermore, the stability of the rotational phase angle estimation can be improved.

The above description is directed to the embodiments of the invention, and does not restrict the apparatus and method of the invention, and various modifications can easily be practiced.

What is claimed is:

1. A sensorless control apparatus of a synchronous motor, which estimates a rotational phase angle of a rotor having electrical saliency and controls the synchronous motor by a PWM inverter, comprising:

a PWM modulation unit which modulates a control instruction, which is input, on the basis of PWM, and outputs a gate signal to each phase switching element of the inverter;

a high-frequency component arithmetic unit which calculates, at each time of switching of the inverter, a high-frequency component of a current which flows in the synchronous motor by a voltage which is determined by the PWM modulation unit and is output from the inverter;

an index arithmetic unit which calculates an index proportional to an estimation error of the rotational phase angle, from the high-frequency component of the current on rotational coordinate axes which rotate in sync with rotation of the rotor; and a rotational phase angle estimation unit which executes an estimation arithmetic operation of the rotational phase angle by using the index.

2. The sensorless control apparatus according to claim 1, wherein the index arithmetic unit determines, as the index, a value which is obtained by projecting the high-frequency component of the current in a predetermined direction on the rotational coordinate axes.

3. The sensorless control apparatus according to claim 2, wherein the index arithmetic unit sets a direction, in which sensitivity of the index to a variation of the estimation error becomes highest, to be the direction in which the high-frequency component is projected.

4. The sensorless control apparatus according to claim 3, wherein a high-frequency voltage instruction superimposition unit generates a high-frequency voltage instruction in a manner to maximize the sensitivity of the index, which is calculated by the index arithmetic unit, to the variation of the estimation error, and superimposes the high-frequency voltage instruction on a voltage instruction for the control.

5. The sensorless control apparatus according to claim 2, wherein the index arithmetic unit alters the direction, in which the high-frequency component is projected, in accordance with a torque instruction value of the synchronous motor.

6. The sensorless control apparatus according to claim 5, wherein a high-frequency voltage instruction superimposition unit generates a high-frequency voltage instruction in a manner to maximize sensitivity of the index, which is calculated by the index arithmetic unit, to variation of the estimation error, and superimposes the high-frequency voltage instruction on a voltage instruction for the control.

7. The sensorless control apparatus according to claim 1, further comprising a high-frequency voltage instruction superimposition unit which superimposes a high-frequency voltage instruction on a voltage instruction for controlling the synchronous motor, the index arithmetic unit calculating the index on the basis of a response current value corresponding to the high-frequency voltage instruction.

8. The sensorless control apparatus according to claim 7, wherein the high-frequency voltage instruction superimposition unit generates the high-frequency voltage instruction in a manner to maximize sensitivity of the index, which is calculated by the index arithmetic unit, to variation of the estimation error, and superimposes the high-frequency voltage instruction on the voltage instruction for the control.

9. A rotational phase angle estimation method in a sensorless control apparatus which estimates a rotational phase angle of a rotor having electrical saliency and controls a synchronous motor by a PWM inverter, the method comprising:

a step of setting a direction of magnetic flux of the rotor to be a d-axis and setting a direction perpendicular to the d-axis to be a q-axis, and finding a distribution of a high-frequency current in a dq-axis coordinate system which rotates in sync with rotation of the rotor;

setting an angle to the d-axis with reference to an axis in a direction of a U-phase coil of the synchronous motor to be a rotational phase angle, setting an estimated angle of the rotational phase angle to be an estimated phase angle, setting an axis in a direction of the estimated phase angle to be a γ-axis, setting an axis perpendicular to the γ-axis to be a δ-axis, and setting an angle between the γ-axis and the d-axis to be an estimation error;

a step of examining in advance an index proportional to the estimation error on the basis of a distribution of the high-frequency current, and acquiring a first index at 0° of the estimation error;

a step of calculating, at each time of switching of the inverter, a high-frequency component in a γδ-axis rotational coordinate system of a current which flows in the synchronous motor;

a step of calculating a second index, which is proportional to the estimation error, from the high-frequency component of the current; and a step of executing an estimation arithmetic operation of the rotational phase angle by using the first index and the second index.

* * * * *